(12) United States Patent
Doglioni Majer (10) Patent No.: US 11,154,160 B2
(45) Date of Patent: Oct. 26, 2021

(54) BEVERAGE DISPENSING MACHINE AND OPERATING METHOD (71) Applicant: RHEAVENDORS Services S.p.A., Como (IT)

(72) Inventor: Luca Doglioni Majer, Carate Uno (IT)

(73) Assignee: RHEAVENDORS SERVICES SpA., Varese (IT)

( * ) Notice: Subject to any disclaimer, the term of this patent is extended or adjusted under 35 U.S.C. 154(b) by 287 days.

(21) Appl. No.: 16/100,200

(22) Filed: Aug. 9, 2018

(65) Prior Publication Data

US 2018/0360262 A1 Dec. 20, 2018

Related U.S. Application Data (63) Continuation of application No. 13/602,281, filed on Sep. 3, 2012, now Pat. No. 10,117,541, which is a continuation of application No. 12/516,709, filed as application No. PCT/IB2007/003770 on Dec. 5, 2007, now abandoned.

(30) Foreign Application Priority Data

Dec. 6, 2006 (EP) ..................................... 06025196

(51) Int. Cl.
*A47J 31/56* (2006.01)
*A47J 31/46* (2006.01)
*A47J 31/52* (2006.01)

(52) U.S. Cl.
CPC ............. *A47J 31/56* (2013.01); *A47J 31/461* (2018.08); *A47J 31/465* (2013.01); *A47J 31/5251* (2018.08); *A47J 31/5253* (2018.08); *A47J 31/5255* (2018.08)

(58) Field of Classification Search
CPC .. A47J 31/5251; A47J 31/461; A47J 31/5253; A47J 31/5255; A47J 31/465; A47J 31/56
USPC ........................ 99/279, 299, 283, 282, 302 R
See application file for complete search history.

(56) References Cited

U.S. PATENT DOCUMENTS

| 3,371,592 | A | * | 3/1968 | Remy | ..................... A47J 31/56 99/282 |
| 3,379,117 | A | * | 4/1968 | Richeson | ................. A47J 31/52 99/283 |
| 3,381,604 | A | * | 5/1968 | Bixby, Jr. | ............. G07F 13/065 99/283 |
| 3,390,626 | A | * | 7/1968 | Holstein | ................. A47J 31/40 99/283 |
| 4,497,361 | A | * | 2/1985 | Hajicek | ................. F24F 3/1423 165/10 |

(Continued)

FOREIGN PATENT DOCUMENTS

| EP | 1210893 A2 | 6/2002 |
| JP | 63-312583 | 12/1988 |

(Continued)

*Primary Examiner* — Jimmy Chou
(74) *Attorney, Agent, or Firm* — Robert J. Hess; Hess Patent Law Firm (57) ABSTRACT

Provided is a beverage dispensing machine, for example a coffee machine, having a brewing chamber. The beverage dispensing machine includes at least one electrovalve for totally or partially blocking the beverage from exiting the brewing chamber based on brewing parameters previously set or monitored in real-time by one or more sensors.

14 Claims, 4 Drawing Sheets

(56) References Cited

U.S. PATENT DOCUMENTS

| | | | |
|---|---|---|---|
| 4,523,503 A | 6/1985 | Julian et al. | |
| 4,590,835 A | 5/1986 | Matsuo | |
| 4,709,555 A * | 12/1987 | Kawai | F04B 49/246 62/196.2 |
| 4,962,871 A * | 10/1990 | Reeves | B05C 5/0225 222/504 |
| 4,968,516 A * | 11/1990 | Thompson | A47J 27/0817 426/233 |
| 4,988,967 A * | 1/1991 | Miller | F16F 9/46 251/129.05 |
| 5,022,994 A * | 6/1991 | Avery | C02F 1/42 137/624.12 |
| 5,045,068 A * | 9/1991 | Kawai | A61M 5/16881 604/226 |
| 5,072,660 A * | 12/1991 | Helbling | A47J 31/405 99/280 |
| 5,095,875 A | 3/1992 | Morris et al. | |
| 5,106,053 A * | 4/1992 | Miller | F16F 9/46 251/129.05 |
| 5,110,087 A * | 5/1992 | Studtmann | H01F 7/13 251/129.16 |
| 5,127,318 A * | 7/1992 | Selby, III | A47J 31/0663 99/295 |
| 5,168,200 A * | 12/1992 | Payne | G01F 1/26 251/129.11 |
| 5,303,639 A * | 4/1994 | Bunn | A47J 31/002 99/289 R |
| 5,312,637 A * | 5/1994 | Midden | A47J 31/053 426/433 |
| 5,337,652 A * | 8/1994 | Fischer | A47J 31/4496 99/282 |
| 5,372,351 A * | 12/1994 | Oliver | F16K 31/055 251/129.03 |
| 5,372,832 A * | 12/1994 | Bunn | A47J 31/002 426/231 |
| 5,375,508 A * | 12/1994 | Knepler | G05B 19/108 99/280 |
| 5,393,540 A * | 2/1995 | Bunn | A47J 31/002 426/231 |
| 5,509,349 A * | 4/1996 | Anderson | A47J 31/4485 99/323.1 |
| 5,601,115 A * | 2/1997 | Broerman | F16K 11/0743 137/595 |
| 5,694,824 A | 12/1997 | Jacko et al. | |
| 5,699,724 A * | 12/1997 | Wettstein | B07C 5/3425 241/14 |
| 5,765,467 A * | 6/1998 | Levine | A47J 31/106 99/282 |
| 5,773,067 A * | 6/1998 | Freychet | A23F 5/243 222/129.1 |
| 5,813,318 A * | 9/1998 | Zanin | A47J 31/0663 99/291 |
| 5,865,096 A * | 2/1999 | Kawabata | A47J 31/36 99/283 |
| 5,980,615 A * | 11/1999 | Roe | B01D 53/0415 96/111 |
| 5,988,586 A * | 11/1999 | Boger | F16K 47/08 138/42 |
| 6,000,317 A * | 12/1999 | Van Der Meer | A47J 31/56 99/280 |
| 6,078,032 A * | 6/2000 | Miller | A47J 31/542 219/628 |
| 6,082,703 A * | 7/2000 | Fava | F16K 3/08 251/129.11 |
| 6,129,006 A * | 10/2000 | Schmed | A47J 31/3609 99/287 |
| 6,142,063 A * | 11/2000 | Beaulieu | A47J 31/56 99/283 |
| 6,148,842 A * | 11/2000 | Kappel | F02M 61/167 137/78.1 |
| 6,155,158 A * | 12/2000 | Anson | A47J 31/007 99/280 |
| 6,164,189 A * | 12/2000 | Anson | A47J 31/56 99/281 |
| 6,279,461 B1 * | 8/2001 | Fukushima | A47J 31/56 99/279 |
| 6,296,091 B1 * | 10/2001 | Hamilton | B60G 17/0152 188/314 |
| 6,382,083 B2 * | 5/2002 | Schmed | A47J 31/4496 99/289 R |
| 6,449,532 B1 * | 9/2002 | Nicol | B67D 1/0006 222/52 |
| 6,505,812 B1 * | 1/2003 | Anastas | F16K 31/0693 251/129.07 |
| 6,526,872 B2 * | 3/2003 | Wong | A47J 31/053 99/282 |
| 6,604,455 B2 | 8/2003 | Areh et al. | |
| 6,711,988 B1 * | 3/2004 | Eugster | A47J 31/36 99/283 |
| 6,736,796 B2 * | 5/2004 | Shekalim | A61M 5/1454 251/129.01 |
| 6,739,240 B2 * | 5/2004 | De Koning | A47J 31/36 99/283 |
| 6,766,106 B2 * | 7/2004 | Roberson | A47J 31/41 222/146.5 |
| 6,959,690 B1 * | 11/2005 | Reynard | F02D 9/1095 123/336 |
| 6,964,222 B1 * | 11/2005 | Tucker | A47J 31/057 99/281 |
| 6,968,765 B2 | 11/2005 | King | |
| 7,013,933 B2 * | 3/2006 | Sher | A23F 5/243 141/100 |
| 7,021,197 B2 * | 4/2006 | Chen | A47J 31/5253 99/291 |
| 7,297,068 B2 * | 11/2007 | Costain | A63D 15/08 473/44 |
| 7,478,812 B2 | 1/2009 | Sokolov | |
| 7,607,385 B2 * | 10/2009 | Halliday | A47J 31/56 99/280 |
| 7,624,473 B2 * | 12/2009 | Kegg | A47L 11/34 15/320 |
| 7,717,026 B1 * | 5/2010 | Lassota | A47J 31/56 99/283 |
| 8,286,547 B1 * | 10/2012 | Lassota | A47J 31/18 99/283 |
| 8,367,136 B2 * | 2/2013 | Doglioni Majer | A47J 31/36 426/431 |
| 8,677,888 B2 * | 3/2014 | Santoiemmo | A23L 2/56 99/323.2 |
| 2001/0022138 A1 * | 9/2001 | Schmed | A47J 31/36 99/299 |
| 2001/0032947 A1 * | 10/2001 | Freisinger | F16K 31/404 251/30.03 |
| 2002/0007802 A1 * | 1/2002 | Chen | C23C 16/4485 122/4 R |
| 2002/0029694 A1 * | 3/2002 | Wong | A47J 31/053 99/280 |
| 2002/0068673 A1 * | 6/2002 | Collier | B04B 1/04 494/5 |
| 2002/0121307 A1 * | 9/2002 | Stacy | F16K 11/052 137/624.13 |
| 2002/0129712 A1 * | 9/2002 | Westbrook | A47J 31/369 99/279 |
| 2003/0003208 A1 * | 1/2003 | Lassota | A47J 31/52 426/433 |
| 2003/0102447 A1 * | 6/2003 | Williams, Jr. | E03C 1/057 251/129.04 |
| 2003/0106550 A1 * | 6/2003 | Harvey | G01F 11/04 128/200.23 |
| 2003/0107013 A1 * | 6/2003 | Pappo | F16K 31/06 251/11 |
| 2003/0110952 A1 * | 6/2003 | Lassota | A47J 31/08 99/279 |
| 2003/0126993 A1 * | 7/2003 | Lassota | A47J 31/402 99/279 |
| 2003/0150333 A1 * | 8/2003 | Fischer | A47J 31/461 99/279 |

(56) References Cited

U.S. PATENT DOCUMENTS

| | | | |
|---|---|---|---|
| 2003/0221564 A1* | 12/2003 | Meineke | A47J 31/60 99/279 |
| 2004/0003786 A1* | 1/2004 | Gatecliff | F16K 31/005 123/90.11 |
| 2004/0079213 A1 | 4/2004 | Jensen et al. | |
| 2004/0159242 A1* | 8/2004 | Geiger | A47J 31/461 99/279 |
| 2004/0194629 A1* | 10/2004 | Jones | A47J 31/402 99/275 |
| 2004/0194631 A1* | 10/2004 | Pope | A47J 31/56 99/279 |
| 2004/0226452 A1* | 11/2004 | Lyall | A47J 31/0621 99/279 |
| 2004/0237747 A1 | 12/2004 | King | |
| 2005/0066820 A1* | 3/2005 | Lussi | A47J 31/5253 99/279 |
| 2005/0167912 A1 | 8/2005 | Sokolov | |
| 2005/0193891 A1* | 9/2005 | Garson | A47J 31/3619 99/279 |
| 2005/0199844 A1* | 9/2005 | Gama | F16K 31/046 251/129.05 |
| 2005/0211939 A1* | 9/2005 | Morisawa | F04B 27/1804 251/129.15 |
| 2005/0218361 A1* | 10/2005 | Shajii | F16K 31/0675 251/129.04 |
| 2005/0247205 A1* | 11/2005 | Chen | A47J 31/36 99/279 |
| 2005/0255064 A1 | 11/2005 | Bruening et al. | |
| 2005/0263732 A1* | 12/2005 | Kurian | F16K 27/0272 251/298 |
| 2005/0279216 A1* | 12/2005 | Miller | A47J 41/0016 99/279 |
| 2006/0011069 A1* | 1/2006 | Spencer | A47J 31/545 99/307 |
| 2006/0037481 A1* | 2/2006 | Bicht | A47J 31/545 99/279 |
| 2006/0042470 A1* | 3/2006 | Anson | F24D 17/00 99/275 |
| 2006/0090653 A1* | 5/2006 | McDuffie | A47J 31/52 99/279 |
| 2006/0207432 A1* | 9/2006 | Van Der Meer | F16K 11/105 99/279 |
| 2006/0255064 A1* | 11/2006 | Donaldson | B67D 7/0216 222/95 |
| 2006/0261179 A1* | 11/2006 | Davies | A61L 9/145 239/34 |
| 2007/0028784 A1 | 2/2007 | Chen | |
| 2007/0040139 A1* | 2/2007 | Niwa | F16K 31/0672 251/129.16 |
| 2007/0157821 A1* | 7/2007 | Panesar | A47J 31/0673 99/279 |
| 2007/0175334 A1* | 8/2007 | Halliday | A47J 31/4492 99/279 |
| 2007/0215826 A1* | 9/2007 | Katoh | F16K 31/0658 251/129.04 |
| 2007/0225870 A1* | 9/2007 | Davidkovich | G05D 16/2013 700/282 |
| 2007/0240550 A1 | 10/2007 | Jacko et al. | |
| 2008/0022822 A1 | 1/2008 | Jacko et al. | |
| 2008/0087254 A1* | 4/2008 | Tanaka | F02D 41/20 123/472 |
| 2008/0233264 A1* | 9/2008 | Doglioni Majer | A47J 31/401 426/594 |
| 2008/0314257 A1* | 12/2008 | Kodden | A23F 5/262 99/302 R |
| 2009/0126577 A1* | 5/2009 | Ternite | A47J 31/36 99/295 |
| 2009/0136639 A1* | 5/2009 | Doglioni Majer | A47J 31/5255 426/431 |
| 2009/0258114 A1* | 10/2009 | Lassota | F24H 1/103 426/78 |
| 2010/0012313 A1* | 1/2010 | Longfield | E21B 23/00 166/66.6 |
| 2010/0018404 A1* | 1/2010 | Villa | A47J 31/545 99/288 |
| 2010/0031826 A1* | 2/2010 | Majer | A47J 31/5251 99/279 |
| 2010/0058931 A1* | 3/2010 | Righetti | G07F 13/065 99/286 |
| 2010/0148106 A1* | 6/2010 | Whitefield | F16K 1/223 251/305 |
| 2010/0199846 A1* | 8/2010 | Aus Der Fuenten | A47J 31/44 99/279 |
| 2019/0014942 A1* | 1/2019 | Juve | A23F 5/262 |

FOREIGN PATENT DOCUMENTS

| | | |
|---|---|---|
| JP | 2002170157 A | 6/2002 |
| JP | 2004174092 A | 6/2004 |
| NL | 88093147 | 7/1990 |
| WO | WO 2004/089173 A2 | 10/2004 |
| WO | WO 2006134479 A2 | 12/2006 |

* cited by examiner

BEVERAGE DISPENSING MACHINE AND OPERATING METHOD

RELATED APPLICATIONS

This application is a continuation application of U.S. application Ser. No. 13/602,281, filed Sep. 3, 2012, and which is a continuation of U.S. application Ser. No. 12/516,709 having a '371 date of Jun. 29, 2009 and which is a national stage entry of PCT/IB2007/003,770 filed Dec. 5, 2007, the contents of each of which are hereby incorporated by reference as if set forth in their entireties.

FIELD OF THE INVENTION

The present invention concerns a beverage dispensing machine and a method for its operation, in particular a fully-automatic or semi-automatic coffee/beverage dispensing machine.

Automatic or semi-automatic machines are known for preparing coffee drinks, or the like, by providing a forced flow of hot water to pass through a brewing chamber containing coffee powder, wherein sometime a mechanic valve is positioned at the exit of the chamber to adjust the backpressure. The valve is calibrated to set both the pressure of the water within the chamber and the time lapse of infusion of the coffee powder.

In general, with beverage dispensing machine it is meant a semi-automatic (the user has to intervene in the preparation of the beverage) or fully automatic machine (preparation of the beverage is carried out automatically by the machine with no need for the user to intervene but for the selection of the desired beverage) for preparing and dispensing a beverage such as, espresso coffee, Americano coffee, cappuccino, latte macchiato, tea, or the like.

BACKGROUND

US 2001/0050002 discloses a machine for preparing an espresso coffee. The brewing chamber comprises a threaded seat, coaxial with the chamber outlet nozzle, wherein a threaded member is inserted which operates as a manually adjustable valve. The threaded member can be screwed within the seat to obstruct the outlet nozzle to a greater or lesser extent, i.e. to partially close the brewing chamber outlet. By adjusting the extent of the insertion of the threaded member within the related seat, the backpressure within the brewing chamber can be adapted to obtain an espresso coffee having the desired organoleptic characteristics. The extent of the insertion of the threaded member within the related seat is provided when the machine is assembled. U.S. Pat. No. 6,711,988 discloses an espresso machine provided with a piston moveable within the brewing chamber to press the coffee powder contained therein and to adjust the volume of the same chamber. At the chamber outlet, in correspondence of the coffee discharge outlet, a mechanical valve is provided to adjust the backpressure. The valve comprises a spring which supports a ball. Normally the ball is pressed by the spring against the discharge outlet of the brewing chamber, thereby preventing the beverage from exiting the chamber. Only when the pressure of the coffee beverage within the chamber is sufficient to contrast the spring load, then the ball is forced back and the beverage is delivered outside the chamber. Controlling of the operation of the valve is achieved by choosing the compression spring characteristic of the valve spring to be installed.

As a matter of fact, traditional machines do not allow for controlling the operation of the valve which acts as a shutter at the brewing chamber outlet. In other words, known valves mostly operate as on/off valves and cannot be controlled to rapidly, or instantly, adjust the backpressure to the desired extent, for instance in order to compensate for other non optimal operating parameters of the coffee machine.

Also, known valves cannot be set to a backpressure value different from the one corresponding to the initial design value without dismantling the machine or manually adjusting the means for creating the backpressure. This drawback applies not only to espresso coffee machines, but also to other manual or automatic machines for preparing and dispensing espresso and other beverages, such as different kinds of coffee drinks (espresso, Americano, cappuccino, etc.), tea, chocolate, etc., which are usually provided with such known valves.

Therefore, the need is felt for machines which allow a control of the operation of the brewing chamber outlet valve to modify brewing time and pressure, and also the brewing process, for meeting the user's taste for what concerns the organoleptic characteristics of the prepared beverage.

Another drawback of known beverage dispensing machines is that they require periodical maintenance for cleaning the valve provided at the brewing chamber outlet. Residues of the dispensed beverages, which build up in correspondence of the valve seat, very often jeopardize the proper functioning of traditional valves. In particular the valve body adheres to the related seat due to the adhesive effect of the residues, thereby retarding or preventing opening of the valve.

SUMMARY OF THE INVENTION

It is an object of the present invention to provide a beverage dispensing machine which obviates the aforesaid drawbacks, being at the same time not expensive, simple to operate and easy to keep clean.

It is still another object of the present invention to provide a beverage dispensing machine which allows for rapidly controlling of the beverage flow rate exiting the brewing chamber.

It is a further object of the present invention to provide a beverage dispensing machine which allows for instantly controlling the valve provided at the exit of the brewing chamber, during the phases of preparing and dispensing the beverage, in order to compensate for possible alterations of other parameters of the machine from the optimal value.

It is a further object of the present invention to provide a beverage dispensing machine provided with a valve within the outlet of the brewing chamber, which valve can be controlled during the phases of preparing and dispensing the beverage in order to affect the brewing conditions, so as to meet the user's preferences with respect to the type and quality of the selected beverage.

These and other objects are achieved by the present invention which relates to a coffee/beverage dispensing machine according to claim 1. The machine may be fully-automatic or semi-automatic.

The invention dispensing machine provides several advantages over prior art embodiments.

Electrovalves are easy to control continuously, e.g. the control unit can operate the electrovalves at each time during the beverage preparation process. Among the electrovalves, piezoelectric valves have a quick response to electric inputs. The control unit of the machine commands the valve by electric signals to rapidly achieve the desired control over the flow rate of the beverage exiting the brewing chamber. The control unit operates on the basis of memorized algorithms.

Advantageously, the electrovalve not only provides an on/off functioning, but does provide also for adjustable chocking of the brewing chamber exit.

Preferably the electrovalve is a piezoelectric valve positioned at the exit of the brewing chamber, for instance within the outlet conduit of the same. Alternatively, the piezoelectric valve may be positioned upstream the brewing chamber.

The machine according to the present invention allows for the electrovalve to be electrically controlled to open/close the outlet of the brewing chamber, to the desired extent, during the operation of the machine. The control unit can operate the valve to compensate at least some undesired changes of the machine operative parameters which are preset for a given beverage to be prepared such as, for instance, the temperature of the water supplied to the brewing chamber, the brewing time, the size of coffee powder, the volume of the brewing chamber, etc.

The control can be a "real time" adjusting of the valve at the exit of the brewing chamber, i.e. while the beverage is being dispensed; the control can also be carried out before each preparation of the beverage, i.e. for adapting brewing pressure and time to the type of beverage selected by the customer.

For instance, if the beverage to be dispensed is an espresso coffee, the control unit commands the valve to open the exit of the brewing chamber after a first time lapse and with a selected flow rate. If the beverage to be dispensed after the espresso is an "Americano" coffee, the control unit commands the valve to open the exit of the brewing chamber after a second time lapse, shorter than the first time lapse, and with a higher flow rate.

A further advantage is that the valve according to the invention is simple to clean, especially the piezoelectric valve. The piezoelectric valve can be operated during a stand-by of the dispensing machine, i.e. when no beverage is being prepared, to promote cleaning of the valve shutter member and the related seat. The valve shutter can be rapidly moved within its seat to clean the related surfaces from residues left by the dispensed beverages. In this way maintenance of the valve is simple and effective, with no need for an external operator to intervene often.

BRIEF DESCRIPTION OF THE DRAWINGS

Further advantages and features of the present invention will become apparent from the following detailed description, with reference to the drawings enclosed as a non-restrictive example, where.

DETAILED DESCRIPTION

Figure 1:
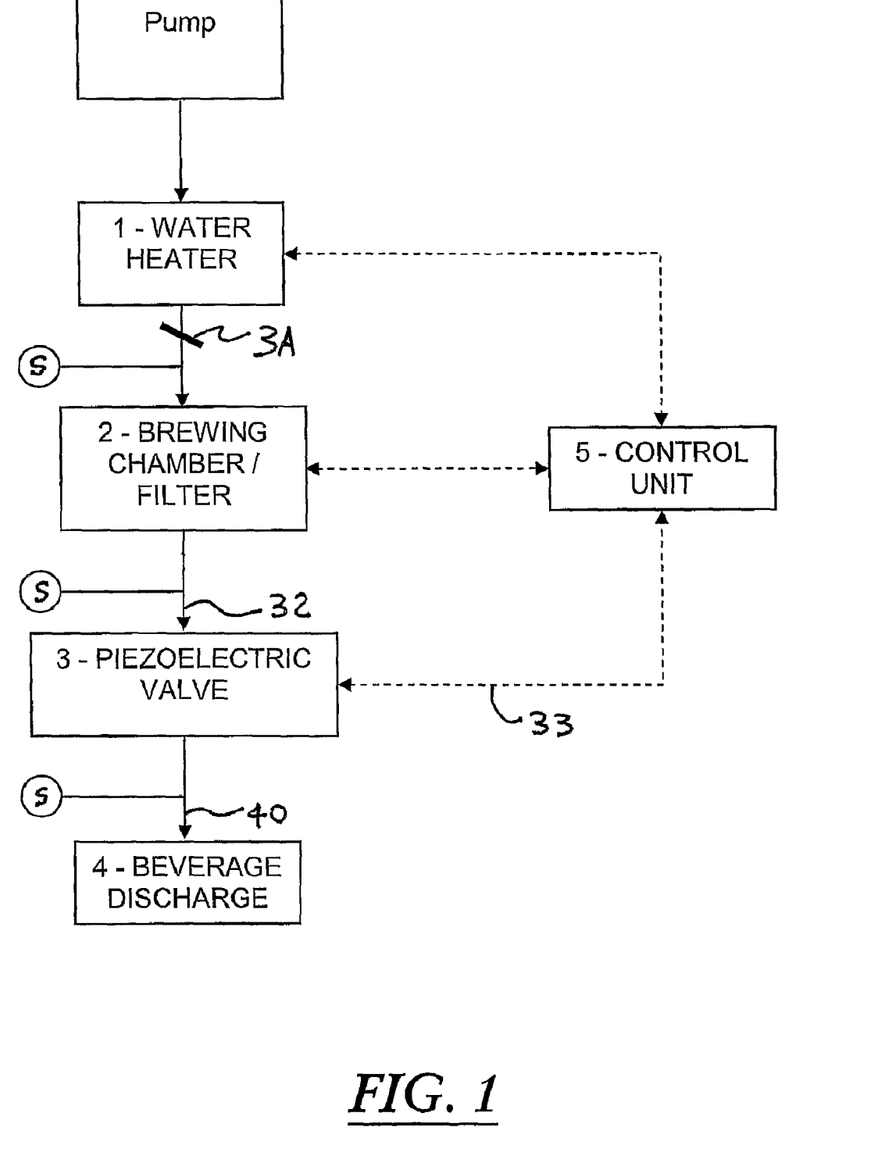
FIG. 1 is a scheme of a beverage dispensing machine according to the present invention.

With reference to FIG. 1, it is shown a simplified scheme of a beverage dispensing machine according to the present invention, provided with a water heater 1, a brewing chamber 2, an electrovalve 3 positioned downstream of the chamber 2 and a discharge section 4 for delivering the beverage to the user. Preferably the electrovalve 3 is a piezoelectric valve, i.e. a valve which can be activated by virtue of the response of a piezoelectric element to electric signals provided by a control unit. Alternatively the electrovalve 3 is a proportional electrovalve. A suitable proportional electrovalve is the 15 series servo-valve sold by the company MOOG Inc.

A control unit 5, for instance an electronic unit, controls at least the valve 3. Preferably the control unit 5 controls the operation of also the water heater 1 and the brewing chamber 2. Control unit 5 runs on the basis of memorized algorithms, which may be software programs, firmware, etc.

The water heater 2 supplies heat to the water which, in turn, is channeled toward the brewing chamber 3 where the beverage is prepared. The water heater may be provided with a temperature sensor which communicates the temperature of the water to the control unit, thereby allowing the same to interrupt heating the water when the desired temperature is achieved.

The brewing chamber 3 provides for a volume to be totally or partially occupied by the ingredient used for preparing the beverage, for instance coffee powder, tea, milk powder, etc. Normally a piston is moveable within the brewing chamber to press the powder to a given extent, i.e. the piston presses the powder at a preset pressure. Preferably in the machine according to the present invention the control unit controls operation of the piston to adjust the pressure imparted to the powder.

The beverage is prepared by supplying hot water to the powder contained within the brewing chamber. The quality of the prepared beverage, i.e. its organoleptic characteristics, depend on several operating parameters of the machine, such as the brewing time, i.e. the time lapsed during infusion, the pressure of the water supplied to the brewing chamber, the amount of powder contained therein and the related grain size, the water temperature, etc.

It is evident that the operating parameters should also be set depending on the type of beverage to be prepared and on the user's preferences. For instance, the user may choose between at least two types of coffee: espresso and Americano coffee, and for each beverage the machine should meet the user's preferences for what concerns the quality or the organoleptic characteristics, for instance by varying the amount of powder to be provided to the brewing chamber, the water temperature, the grain size of the coffee powder, etc.

The control unit 5 provides for setting of the operating parameters of the machine on the basis of the user's choices. On this purpose, the machine is provided with a user interface allowing the user to select among several settings of the operating parameters. According to the invention, the dispensing machine is provided with at least one electrovalve 3, that is preferably provided downstream of the brewing chamber for controlling the beverage flow rate exiting the brewing chamber. As alternative, the valve 3 is provided upstream of the brewing chamber for controlling the water flow rate entering the brewing chamber. According to another embodiment, two valves are provided, a first one 3A upstream of the brewing chamber and the second one downstream of the same chamber (FIG. 1).

Piezoelectric valves suitable for being used in the machine of the invention are available on the market at low cost and are proved to be reliable. In general such valves have minimum dimensions, thereby being particularly suitable for installation at the exit of the brewing chamber, where usually the room available is limited.

Suitable valves are e.g. those sold by ASCO JOUCO-MATIC, series 630, and, more generally, those that can handle flow rates within the range of 1-20 ml/s (when open) and pressures within the range 1.5-20 bar.

Sensors S are provided for measuring the flow rate and/or the pressure and/or the temperature of the flow downstream of the water heater, upstream and downstream of the brewing chamber 2 and downstream of the piezoelectric valve 3.

Figure 2:
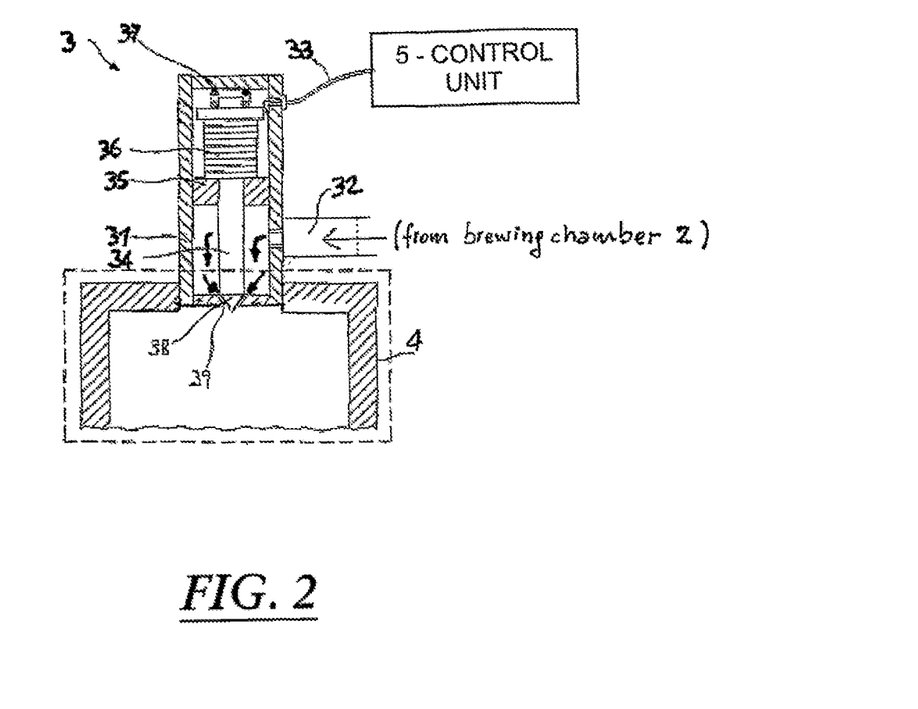
FIG. 2 is a schematic section view of a first piezoelectric valve to be used in the machine according to the present invention.

FIG. 2 shows a section view of a suitable piezoelectric valve 3. The valve 3 comprises a body 31 arranged in fluid connection with the brewing chamber 2 (shown in FIG. 1) directly or through a short passage 32. A shutter 34 is moveable within the body 31 to open/close a discharge outlet 39, which opens into a beverage delivering section 4. The delivering section 4 is for channeling the prepared beverage toward the user's cup, glass or the like.

The shutter 34 may have several shapes. The one shown in FIG. 2 is needle shaped and has a first end coupled to a piezoelectric element 36 and a second distal end 38, which is tapered or conical. The shape of the second distal end 38 is complementary with respect the shape of a seat 39 of the valve body 31.

The shutter 34 slides across the internal wall 35 while being biased by a spring element 37. Normally the shutter 34 abuts the seat 39 with its distal end 38, i.e. normally the valve 3 is closed.

Functioning of the valve 3 is simple. The control unit 5, by means of the electric connection 33, activates the piezoelectric element 36 which expands, at the same time overcoming the force of the spring element 37, thereby causing the shutter 34 to retract its second distal end 38 from the outlet/seat 39. When the outlet 39 is open, the beverage coming from the brewing chamber 2 and entering the valve body 31 is allowed to flow toward the discharge section 4. When the control unit 5 deactivate the piezoelectric element 36, the shutter 34 is pushed by the spring element 37 back in its initial position, thereby causing the second distal end 38 to abut the seat 39, thereby closing the exit and preventing the beverage from flowing outside the valve body 31 toward the delivering section 4.

Advantageously, the stroke of the shutter 34 is directly controllable by the control unit 5 to adjust the flow rate of the dispensed beverage. In particular, the stroke of the shutter 34 depends upon the voltage supplied by the control unit 5 to the piezoelectric element 36.

Figure 3:
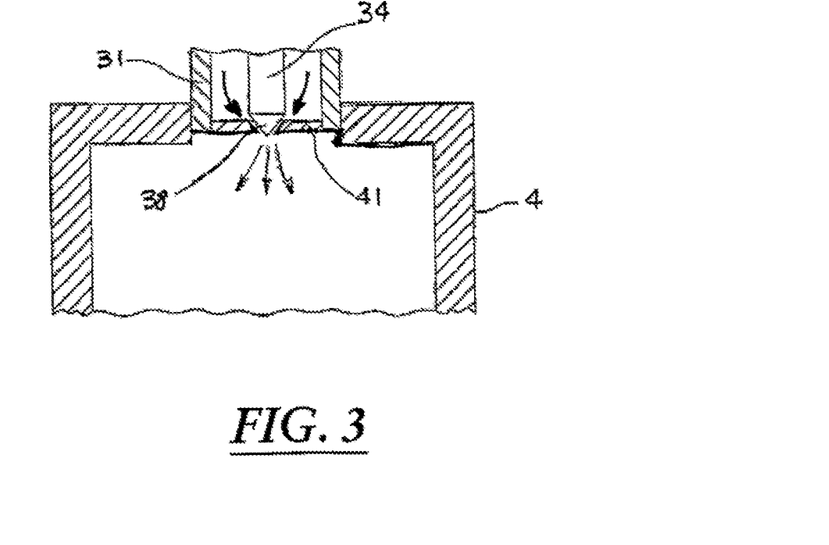
FIG. 3 is a section view of a particular of the valve shown in FIG. 2, in a first configuration.
Figure 4:
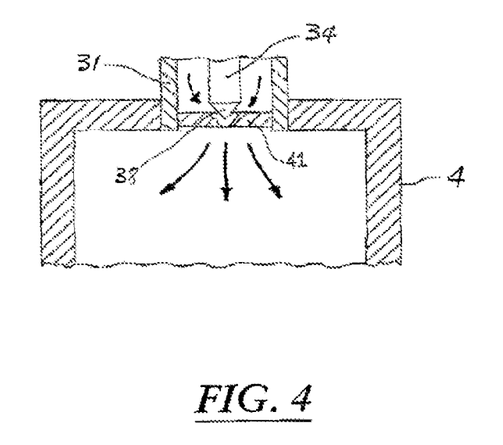
FIG. 4 is a section view of a particular of the valve shown in FIG. 2, in a second configuration.

FIGS. 3 and 4 show, in a section view, a particular of the valve 3. The shutter 34 in FIG. 3 is raised above the seat 39 to a minimum extent to allow a minimum flow rate of the beverage, for instance 1 ml per second of espresso coffee. The shutter 34 in FIG. 4 is raised above the seat 39 to the maximum extent to allow the maximum flow rate of the same beverage, for instance 10 ml per second.

Advantageously the piezoelectric valve 3 allows the control unit 5 for full controlling the beverage flow rate exiting the brewing chamber, i.e. the control unit 5 operates the valve 3 so as to adjust the flow rate from 0 ml/s (or approximately 0 ml/s) to a maximum value of the flow rate, for instance 20 ml/s, preferably so as to maintain the pressure within the chamber 2 substantially constant.

It is to be understood that operation of the valve 3 has effect also on the pressure of the water within the brewing chamber 2. When the valve 3 is closed, the pressure within the chamber 2 builds up while pressurized water is supplied from the water heater, by means of a pump, to the same chamber 2. Depending on the position of the shutter 34, a certain flow rate of beverage may exit the brewing chamber 2, thereby reducing, or preventing, the pressure build up. In this respect, the control unit 5 adjusts the backpressure downstream from the brewing chamber by adjusting the extent of the shutter 34 raising above the seat 39, i.e. by diminishing or increasing the gap between the distal end 38 and the seat 39.

For instance, the control unit 5 adjusts the position of the shutter 34 to increase, reduce or stop the flow rate of the beverage exiting the brewing chamber to, respectively diminish or increasing the infusion time. The control unit 5 may also control the operation of the valve 3 so as to maintain the pressure in the brewing chamber within a preset range, for instance 10 to 15 bar, or to compensate for possible variation in the grain size of the coffee powder. In this respect, the control unit 5 provides for a "real time" feedback control of the piezoelectric valve 3.

In order to clean the valve, the piezoelectric element of the valve, for instance the element 36 in FIG. 2, is excited, i.e. activated, by control unit 5 at high frequency to transmit vibrations to the shutter 34. This is done when the beverage dispensing machine is in stand-by, that is when the machine is not required to prepare a beverage. When the shutter 34 is forced to vibrate, during a cleaning cycle, residues which may be present on the shutter 34 and the seat 39 surfaces are at least partially detached. In other words, vibrations imparted to the shutter 34 and the friction between the distal end 38 and the seat 39 promote detaching of the residues from the surfaces.

The beverage dispensing machine according to the present invention may provide for periodic cleaning cycles of the valve 3, thereby preventing chocking of the seat 39 by the residues of the dispensed beverages and subsequent malfunctioning of the machine. The valve of the invention machine may be provided with a piezoelectric valve of a different type than valve 3. The shutters and/or the seat are made of piezoelectric materials and the opening/closing are obtained by the expansions of the elements upon supplying a voltage to said shutter and/or to seat elements. This embodiment has the additional advantage of being simple and faster (no springs are required) and of improving the cleaning effect because the valve is vibrated and expanded. The functioning of this embodiment 3' is disclosed with reference to FIG. 5.

Figure 5:
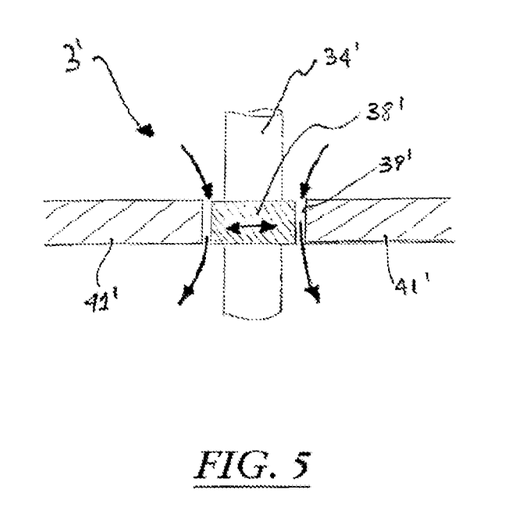
FIG. 5 is a section view of a second piezoelectric valve to be used in the machine according to the present invention.

In FIG. 5 the shutter 38' is a disc fixed onto a support shaft 34'. The wall 41' provides for the seat 39'. Either one of the shutter 38' or the wall 41' is made of a piezoelectric material and is electrically excited by control unit 5. Alternatively both the shutter 38' and the wall 41' are made of a piezoelectric material. When the valve 3' is operated, i.e. when control unit 5 excites the piezoelectric material of the shutter 38' and/or the wall 41', such material undergoes an expansion, that is the dimension change. For instance, when both the shutter 38' and the wall 41' are made of a piezoelectric material, the shutter 38' becomes wider while the seat 39' becomes narrower, thereby chocking or definitely closing the outlet. The extent of the opening of the valve 3' depends upon the entity of the expansion of the piezoelectric material of the shutter and/or the related seat, which expansion is adjusted by powering the material with the proper voltage.

When only the shutter 38' is made of a piezoelectric material, the seat 39' remains still, i.e. does not expand. When only the seat 39', i.e. the wall 41', is made of a piezoelectric material, the shutter 39' remains still, i.e. does not expand.

Cleaning of the valve 3' is accomplished as described above with reference to valve 3, i.e. by vibrating the piezoelectric member (either one of the shutter 38' and the wall 41', or both).

Hereinafter there are disclosed two examples of the operation of the machine according to the present invention, each example being related to the preparation of a specific beverage.

EXAMPLE 1

Coffee 1

An amount of 8 g of coffee powder is loaded in the brewing chamber and pressed by a moveable piston at 10 kg/cm². The piston is blocked in its final position, i.e. above the coffee powder, by means of mechanical or electrical restraining devices. The coffee powder is provided by a grinder through a chute extending toward the brewing chamber.

Water is heated by powering the water heater 1 until the temperature sensor measures 90.degree. C. Circulation of the water across the water heater 1 and toward the brewing chamber 2 is provided by a pump (not shown) positioned upstream of the heater 1 (for instance a rotative pump).

An on/off valve, positioned upstream of the brewing chamber 2 is commanded by the control unit 5 to open, thereby allowing the hot water to enter the chamber 2. At this time the piezoelectric valve 3 remains closed and the pressure within the brewing chamber increases.

After a preset time lapse, for instance 5 seconds, the control unit 5 commands the valve 3 to open. The piezoelectric valve 3 is promptly responsive and the shutter 34 is rapidly raised a given extent above the seat 39, this causing the beverage to exit the chamber 2. The pressure within the chamber suddenly drops, for instance from 15 bar to 10 bar.

If the user has selected a "strong" espresso coffee, the control unit 5 commands the valve 3 to close again for a short time lapse, for instance 20 ms, in order to promote a pressure recover within the brewing chamber 2. Finally the control unit 5 opens the valve 3 for completing delivering of the beverage to the user.

After a preset time lapse from the beverage discharge, for instance after 30 seconds (or later or once a day), if the machine is not required to prepare a new beverage, the control unit 5 commands the valve 3 to execute one or more cleaning cycle.

Cleaning cycles have a variable duration, for example from 10 seconds to 30 seconds. The piezoelectric element 36 is excited by high frequency impulses provided by the control unit 5 so as to cause rapid vibrations of the shutter 34. In particular, the shutter 34 rapidly moves up and down and repetitively abuts the seat 39. Such vibrations promote detaching of the beverage residues from the surfaces of the same shutter 34 and seat 39.

EXAMPLE 2

Coffee 2

An amount of 10 g of coffee powder is loaded in the brewing chamber 2 and pressed by a moveable piston at 4 kg/cm². The piston is then blocked above the coffee powder, within the brewing chamber.

Water is heated by powering the water heater 1 until the temperature sensor measures 80.degree C.

An on/off valve, positioned upstream of the brewing chamber 2 is commanded by the control unit 5 to open, thereby allowing the hot water to enter the chamber 2. At this time the piezoelectric valve 3 remains closed and the pressure within the brewing chamber increases up to 10 bar.

When the pressure of 10 bar within the brewing chamber is met, or after 2 seconds, the control unit 5 commands the valve 3 to open. The piezoelectric valve 3 is promptly responsive and the shutter 34 is rapidly raised a given extent above the seat 39, this causing the beverage to exit the chamber 2.

Upon completion of the delivering of the beverage to the user, the control unit 5 activates the valve 3 for a cleaning cycle of 5 seconds. During the cleaning of the valve 3 a 5 ml/s flow rate of hot water is supplied to the empty brewing chamber and through the same valve 3 for rinsing the related surfaces and optimize cleaning from residues. Due to the characteristics of the piezoelectric elements, such as element 36, at least a portion of the valve body 31 and the shutter 34 are easily vibrated by powering the same piezoelectric element with proper impulse train. For each cleaning cycle, the element 36 may be electrically excited for 5 s, 10 s, 20, s, 30 s, etc. Cleaning cycles may be frequently provided to avoid build up of residues within the valve 3.

In other words, piezoelectric valves are operable not only for allowing control over the machine operation during brewing of the beverage, but are also operable to provide "self-cleaning" cycle.

Figure 6:
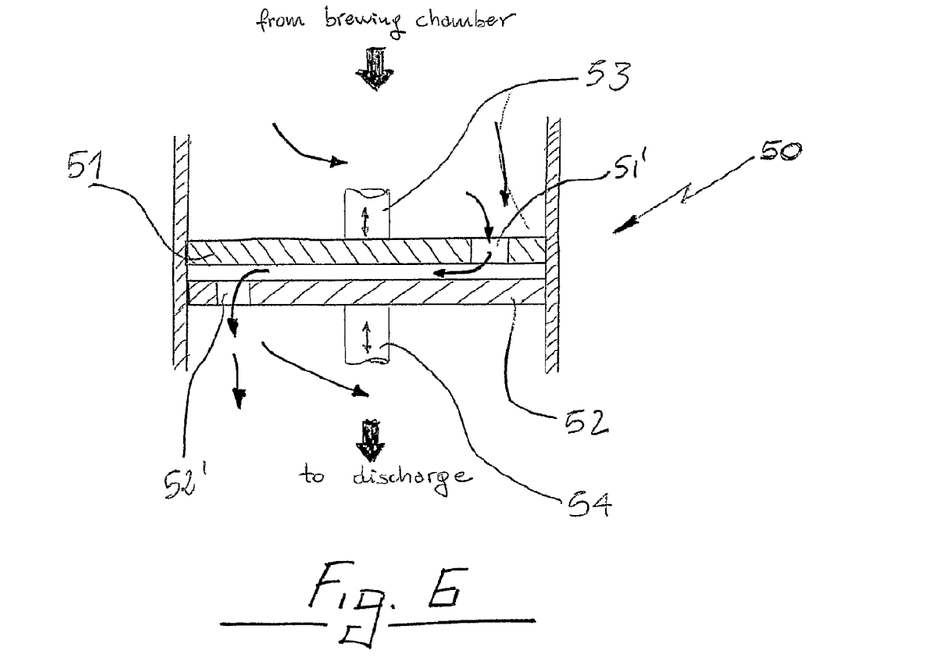
FIG. 6 is a schematic section view of a third valve to be used in the machine according to the present invention.

FIG. 6 shows another piezoelectric valve 50 positioned to intercept the flow at the exit of the brewing chamber. The valve 50 comprises two plate elements 51, 52 each having a through hole 51', 52' for allowing the beverage to flow through the respective element. Holes 51' and 52' are not aligned, but are arranged at opposed sides with respect to the centre of the plate elements. Element 51, 52 are provided with respective shafts 53, 54 at least one of which is made of a piezoelectric material. When the valve 50 is closed, plate elements 51 abut the plate element 52. When the piezoelectric shaft 53 and/or 54 is/are activated, the elements 51 and 52 are separated to the desired extent and a gap is present between them, as shown in FIG. 6, thereby allowing the flow of the beverage to exit the brewing chamber 2 toward the discharge 4.

Figure 7:
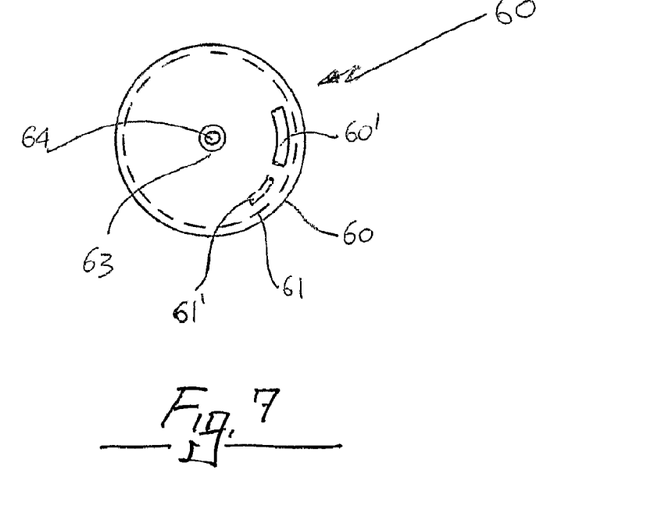
FIG. 7 is a schematic section view of a fourth valve to be used in the machine according to the present invention.

As alternative to the piezoelectric valve 50, a proportional electrovalve may be used (FIG. 7). The valve shown in FIG. 7 comprises two disc plates 60 and 61, similar to the plates 51 and 52, having respective slots 60', 61', arranged at the exit of the brewing chamber 2. The slots 60', 61' are through holes. The disc plates 60, 61 are positioned one abutting the other. At least one disc plate 60 or 61 can be rotated by a respective shaft 63, 64 by an electrically actuated element (not shown). When the slots 60', 61' are mutually arranged as shown in FIG. 7 the valve 50 is closed. When the disc plates 60, 61 are rotated one with respect to the other, the slot 60' intercepts, partially or totally, the slot 61', thereby permitting the beverage to exit the brewing chamber 2. By adjusting the relative rotation of the disc plates 60, 61, i.e. the extent of superimposition of the slots 60' and 61', it is possible to adjust the flow rate which is permitted to trespass the valve 60. It is to be understood that slots 60' and 61' may have a different shape from the one shown in FIG. 7. For instance slots 60' and 61' can be circular holes. What is important is that the valve 60 provides for regulating the flow rate by adjusting the superimposition of the slots 60' and 61'.

The invention claimed is:

1. A beverage dispensing machine, comprising:
a brewing chamber adapted to obtain a beverage,
an electrovalve controllable to adjust the beverage flow rate exiting the brewing chamber,
a control unit configured to effect real time adjusting of the electrovalve at the exit of the brewing chamber as the beverage is being dispensed, wherein the control unit carries out control before each preparation of beverage for adapting brewing pressure and time to a type of beverage selected, and
sensors to measure at least one of flow rate, pressure and temperature of flow downstream of a water heater to provide a feedback control of said electrovalve, said electrovalve being electrically controlled by said control unit to obstruct a discharge outlet of said brewing chamber at least partially to a desired extent to adjust the beverage flow rate exiting the brewing chamber,
wherein if the beverage to be dispensed is an espresso coffee as a result of being so selected, the control unit commands the electrovalve to open the exit of the brewing chamber after a first time lapse and with a selected flow rate and then, if the beverage to be dispensed after the espresso is an "Americano" coffee as a result of being so selected, the control unit commands the valve to open the exit of the brewing chamber after a second time lapse, shorter than the first time lapse, and with a higher flow rate.

2. The beverage dispensing machine according to claim 1, wherein said electrovalve is provided at least at the discharge outlet of said brewing chamber.

3. The beverage dispensing machine according to claim 1, wherein said control unit operates said electrovalve, on the basis of memorized algorithms, to adjust the pressure within the brewing chamber.

4. The beverage dispensing machine according to claim 1, further comprising means for monitoring one or more operative parameters of the beverage dispensing machine, and wherein said control unit is set to operate said electrovalve to compensate for variations of one or more of said operative parameters from an expected value during operation of said beverage dispensing machine.

5. The beverage dispensing machine according to claim 1, wherein said electrovalve is a proportional electrovalve.

6. The beverage dispensing machine according to claim 1, wherein said electrovalve is a piezoelectric electrovalve.

7. The beverage dispensing machine according to claim 1, wherein the electrovalve not only provides an on/off functioning to enable obstruction of the discharge outlet of said brewing chamber totally, but provides also for adjustable chocking of the brewing chamber exit to obstruct the outlet of said brewing chamber partially.

8. The beverage dispensing machine according to claim 6, comprising:
a further valve positioned upstream of the brewing chamber.

9. The beverage dispensing machine according to claim 1, wherein the control unit is configured to operate the electrovalve to compensate for at least some undesired changes of machine operative parameters, which are preset for a given beverage to be prepared, the machine operative parameters being selected from the group consisting of temperature of the water supplied to the brewing chamber, brewing time, size of coffee powder, and volume of the brewing chamber.

10. A beverage dispensing machine, comprising:
a brewing chamber adapted to obtain a beverage,
an electrovalve controllable to adjust the beverage flow rate exiting the brewing chamber, wherein the electrovalve is a piezoelectric electrovalve, and
sensors to measure at least one of flow rate, pressure and temperature of flow downstream of a water heater to provide a feedback control of said electrovalve, said electrovalve being electrically controlled by said control unit to obstruct a discharge outlet of said brewing chamber at least partially to a desired extent to adjust the beverage flow rate exiting the brewing chamber,
wherein the piezoelectric valve is operative during a stand-by of the dispensing machine when no beverage is being prepared to enable cleaning of a shutter member of the piezoelectric valve and of a related seat by imparting vibrations to the shutter member that move the shutter member within the related seat to create friction between an end of the shutter and the related seat that results in detachment of residues left by dispensed beverages.

11. A beverage dispensing machine, comprising:
a brewing chamber adapted to obtain a beverage,
an electrovalve controllable to adjust the beverage flow rate exiting the brewing chamber, wherein the electrovalve is a piezoelectric electrovalve, and
sensors to measure at least one of flow rate, pressure and temperature of flow downstream of a water heater to provide a feedback control of said electrovalve, said electrovalve being electrically controlled by said control unit to obstruct a discharge outlet of said brewing chamber at least partially to a desired extent to adjust the beverage flow rate exiting the brewing chamber,
wherein the piezoelectric valve is operative during a stand-by of the dispensing machine when no beverage is being prepared to enable cleaning of a shutter member of the piezoelectric valve and of related seat elements by imparting vibrations to the shutter member that move the shutter member within the related seat to create friction between an end of the shutter and the related seat that results in detachment of residues left by dispensed beverages, wherein at least one of the shutter member and the seat elements are made of piezoelectric materials and opening/closing of the piezoelectric valve is obtained upon supplying a voltage to at least one of said shutter member and seat elements.

12. The beverage dispensing machine according to claim 1, wherein the control unit is configured to adjust backpressure downstream from the brewing chamber by adjusting an extent of a shutter of the electrovalve raising above a seat by diminishing or increasing a gap between a distal end of the shutter and the seat.

13. A beverage dispensing machine, comprising:
a brewing chamber adapted to obtain a beverage,
an electrovalve controllable to adjust the beverage flow rate exiting the brewing chamber, and
sensors to measure at least one of flow rate, pressure and temperature of flow downstream of a water heater to provide a feedback control of said electrovalve, said electrovalve being electrically controlled by said control unit to obstruct a discharge outlet of said brewing chamber at least partially to a desired extent to adjust the beverage flow rate exiting the brewing chamber, wherein the electrovalve includes a shutter and a related seat, the electrovalve being operative in a manner such that as the control unit excites piezoelectric material of at least one of the shutter and the related seat, the piezoelectric material undergoes an expansion that is a dimension change so that an extent of opening of the electrovalve depends upon an extent of the expansion that arises in response to powering the piezoelectric material with an appropriate voltage.

14. A beverage dispensing machine, comprising:

a brewing chamber adapted to obtain a beverage, an electrovalve controllable to adjust the beverage flow rate exiting the brewing chamber, and sensors to measure at least one of flow rate, pressure and temperature of flow downstream of a water heater to provide a feedback control of said electrovalve, said electrovalve being electrically controlled by said control unit to obstruct a discharge outlet of said brewing chamber at least partially to a desired extent to adjust the beverage flow rate exiting the brewing chamber, wherein the electrovalve includes two disc plates having respective slots arranged at the exit of the brewing chamber, the two disc plates being arranged one abutting each other and being rotatable with respect to each other to regulate the beverage flow rate existing said brewing chamber by adjusting the superimposition of the respective slots relative to each other.

* * * * *